US012591789B2

(12) United States Patent
Liu et al.

(10) Patent No.: US 12,591,789 B2
(45) Date of Patent: Mar. 31, 2026

(54) KNOWLEDGE DISTILLATION IN MULTI-ARM BANDIT, NEURAL NETWORK MODELS FOR REAL-TIME ONLINE OPTIMIZATION

(71) Applicant: Indeed, Inc., Austin, TX (US)

(72) Inventors: Ziying Liu, Sunnyvale, CA (US); Haiyan Luo, Sunnyvale, CA (US); Jianjie Ma, Sunnyvale, CA (US); Yu Sun, Sunnyvale, CA (US)

(73) Assignee: Indeed, Inc., Austin, TX (US)

( * ) Notice: Subject to any disclaimer, the term of this patent is extended or adjusted under 35 U.S.C. 154(b) by 1018 days.

(21) Appl. No.: 17/331,475

(22) Filed: May 26, 2021

(65) Prior Publication Data

US 2023/0214670 A1      Jul. 6, 2023

Related U.S. Application Data

(60) Provisional application No. 63/035,531, filed on Jun. 5, 2020, provisional application No. 63/030,287, filed on May 26, 2020.

(51) Int. Cl.
| | |
|---|---|
| *G06N 3/045* | (2023.01) |
| *G06N 3/047* | (2023.01) |
| *G06N 3/08* | (2023.01) |
| *G06N 3/09* | (2023.01) |
| *G06N 3/096* | (2023.01) |
| *G06N 5/022* | (2023.01) |

(52) U.S. Cl.
CPC ............. *G06N 5/022* (2013.01); *G06N 3/045* (2023.01); *G06N 3/047* (2023.01); *G06N 3/08* (2013.01)

(58) Field of Classification Search
CPC ........ G06N 5/022; G06N 3/045; G06N 3/047; G06N 3/08
See application file for complete search history.

(56) References Cited

U.S. PATENT DOCUMENTS

| | | | |
|---|---|---|---|
| 2017/0103413 A1* | 4/2017 | He | G06Q 30/0244 |
| 2018/0336465 A1* | 11/2018 | Kim | G06N 3/08 |
| 2019/0244110 A1* | 8/2019 | Qiu | G06N 3/126 |
| 2020/0034702 A1* | 1/2020 | Fukuda | G06N 3/08 |

OTHER PUBLICATIONS

Li, Lihong, "Generalized Thompson Sampling for Contextual Bandits", Oct. 27, 2013, arXiv, pp. 2-3 (Year: 2013).*

* cited by examiner

*Primary Examiner* — Usmaan Saeed
*Assistant Examiner* — Skylar K Vanwormer

(57) ABSTRACT

A knowledge distillation system and method trains neural networks utilizing a non-conventional replay buffer and augmented data tuples. In at least one embodiment, the knowledge distillation system and method pretrain a teacher model that implements a contextual bandit algorithm. A lightweight student model determines online contextual bandit data tuples as to context x, arm/action a, and reward/payoff r. The data tuples are stored in a replay buffer. The teacher model randomly samples data tuples from the replay buffer and augments the sampled data tuples. Augmented data tuples are stored in the replay buffer. The student model batch processes augmented data tuples to update parameters of contextual bandit data tuples.

20 Claims, 7 Drawing Sheets

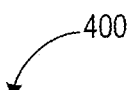

—400

---

Algorithm 1 Thompson Sampling with Dropout

---

Coefficients for student models at step $t$ $\theta_t$; Student Models $M_S^a(C;\theta)$; Drop out rate $\epsilon$; Pre-trained Teacher Model $M_T^a(C)$;

for $t = 1, 2, ..., T$ do

Receive context $C_t$

Generate $M_{S,\epsilon}^a(C;\theta)$ by randomly setting neuron to 0 with probability $\epsilon$ Selection action $A_t = BestAction(C_t;\theta_t)$ based on $M_{S,\epsilon}^a(C;\theta)$ Take action $A_t$ Observe reward $R_t$ Append $(C_t, A_t, R_t)$ to the replay buffer (partial list of historical data) $H$ Update $M_S^a(C;\theta)$ with $H$ and $M_T^a(C)$ using adam optimizer, with loss function described in Section 3.2 end for

*Figure 4*

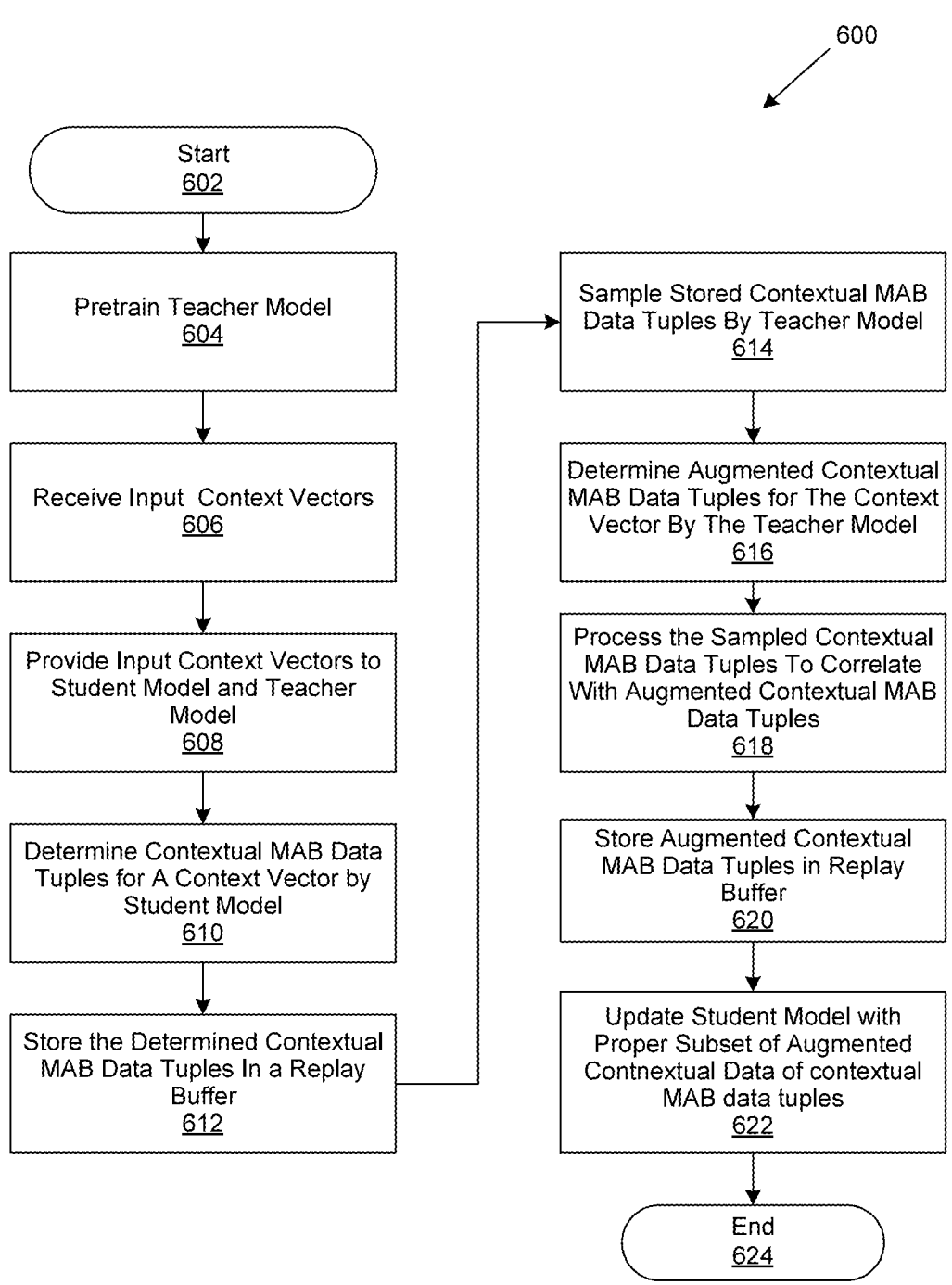

600

Start
602

Pretrain Teacher Model
604

Receive Input Context Vectors
606

Provide Input Context Vectors to
Student Model and Teacher
Model
608

Determine Contextual MAB Data
Tuples for A Context Vector by
Student Model
610

Store the Determined Contextual
MAB Data Tuples In a Replay
Buffer
612

Sample Stored Contextual MAB
Data Tuples By Teacher Model
614

Determine Augmented Contextual
MAB Data Tuples for The Context
Vector By The Teacher Model
616

Process the Sampled Contextual
MAB Data Tuples To Correlate
With Augmented Contextual MAB
Data Tuples
618

Store Augmented Contextual
MAB Data Tuples in Replay
Buffer
620

Update Student Model with
Proper Subset of Augmented
Contnextual Data of contextual
MAB data tuples
622

End
624

*Figure 6*

KNOWLEDGE DISTILLATION IN MULTI-ARM BANDIT, NEURAL NETWORK MODELS FOR REAL-TIME ONLINE OPTIMIZATION

CROSS-REFERENCE TO RELATED APPLICATIONS

The present application claims priority to U.S. Provisional Patent Application No. 63/030,287, filed May 26, 2020, entitled "Systems and Methods to Enhance Technology Including Employment and Security Related Technology", which is incorporated herein by reference.

The present application also claims priority to U.S. Provisional Patent Application No. 63/035,531, filed Jun. 5, 2020, entitled "Systems and Methods to Enhance Technology Including Jobs Filter and Real-Time Online Optimization", which is incorporated herein by reference.

BACKGROUND OF THE DISCLOSURE

Field of the Disclosure

The present invention relates to supervised learning processing, and more particularly to a system, method, and computer program product involving distillation of a model implementing, in at least one embodiment, a contextual multi-arm bandit algorithm to improve real-time decision making performance.

Description of the Related Art

A contextual multi-arm bandit algorithm, or simply referred to as contextual bandit, is an extension of the classic multi-arm bandit (MAB) algorithm. Each iteration of the MAB algorithm evaluates a context vector. This context vector, along with historical actions and rewards, can be used by a policy to choose the best arm/resource to play/choose. As a natural formulation for most real-life online decision making problems, the contextual bandit algorithm fits well in many sequential decision making applications, such as a recommender system, advertisement creative (e.g., webpage ads) optimization, information retrieval, etc.

Algorithms solve contextual bandit problems by determining the best arm to select to provide the highest reward. An arm corresponds to a particular resource choice, such as selection of a resource from a collection of resources, e.g., a collection of advertisements. The algorithms provide a linear relation that is assumed between an arm's expected reward and the context. Deep contextual bandit algorithms, such as those implementing deep learning and approximate Bayesian methods, and neural networks, can be used to model a context versus reward relationship and are relatively accurate.

Deep contextual bandit algorithms tend to be slow at inference time as compared to traditional linear approaches. The problem becomes more apparent when the number of arms, i.e. choices, are increased. For example, for a contextual bandit problem with N arms, a network is evaluated N times at each inference step. For applications such as online advertisements (e.g., interactive webpages) and recommendation systems, decisions should be made in real-time with low latency to minimize frustration of users.

SUMMARY

A method, system and computer-readable medium that comprises pretraining a teacher model for the neural network that processes input context vectors to determine contextual multi-arm bandit (MAB) data tuples using a contextual MAB algorithm; receiving input context vectors; providing the input context vectors to a student model and the teacher model; determining contextual MAB data tuples for a context vector by a student model using the contextual MAB algorithm, wherein the MAB data tuples include the context vector, an arm, and a reward; storing the contextual MAB data tuples determined by the student model in a replay buffer; sampling the contextual MAB data tuples from the replay buffer by the teacher model; determining augmented contextual data MAB data tuples for the context vector by the teacher model using the contextual MAB algorithm; processing, with the teacher model, the contextual MAB data tuples sampled from the replay buffer to correlate the sampled contextual MAB data tuples with the augmented contextual data MAB data tuples; storing the augmented contextual MAB data tuples in the replay buffer; and updating the student model with a proper subset of the augmented contextual data of contextual MAB data tuples.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

FIG. 4 is an example sampling algorithm.

FIG. 6 is a flowchart depicting example operations that may be executed in certain embodiments of the disclosed system for knowledge distillation from a teacher model implementing contextual multi-arm bandit algorithms to a student model.

DETAILED DESCRIPTION

Figure 1:
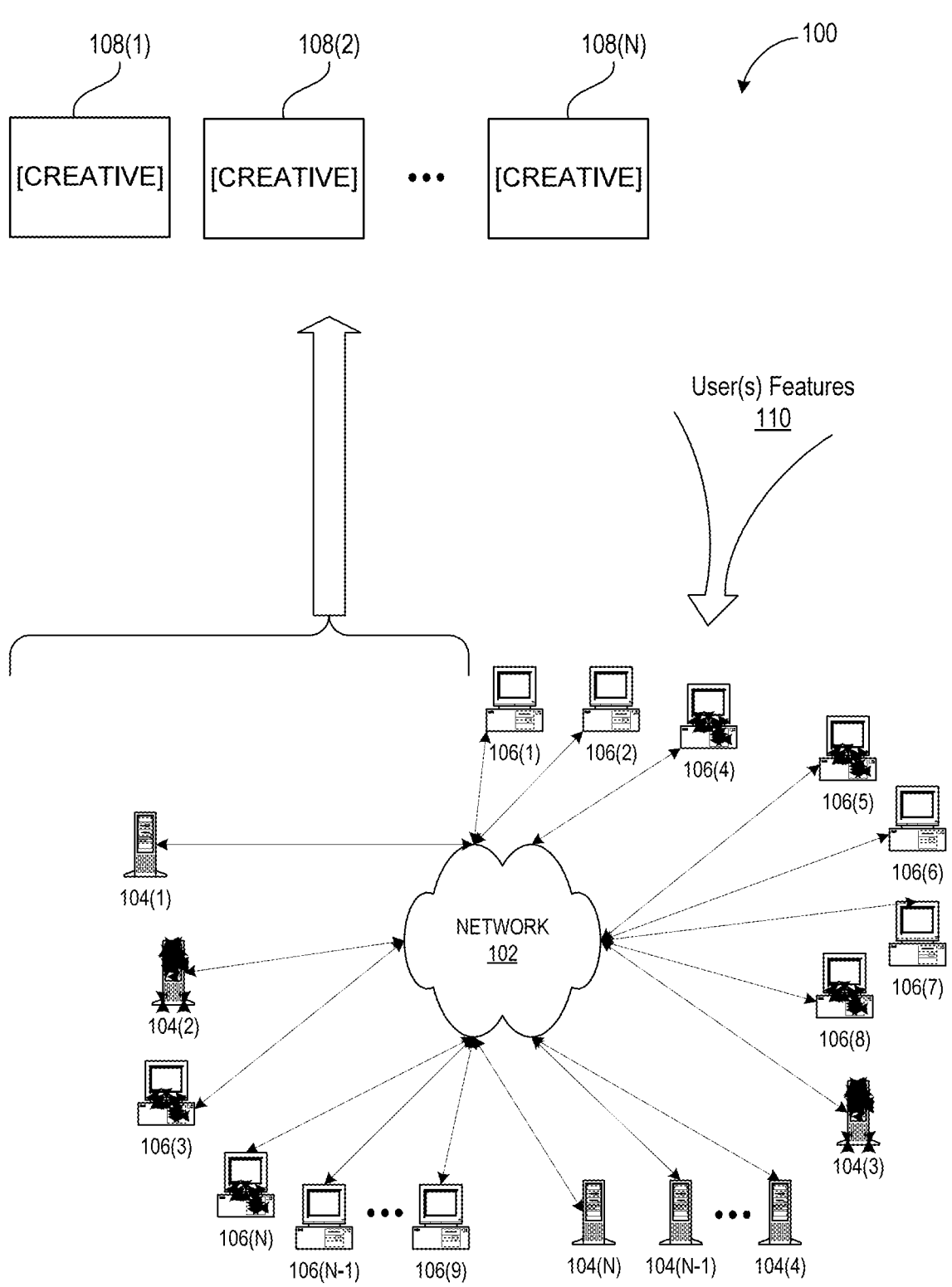
FIG. 1 depicts a network environment in which at least some embodiments of the methods and systems that are disclosed may be practiced.

Described herein are knowledge distillation systems and methods train neural networks utilizing a non-conventional replay buffer and augmented data tuples. In general, knowledge distillation in neural networks trains a more compact, sparser, lightweight model (referred to herein as a student model) with information from a denser but more computational cumbersome neural network model (referred to herein as a teacher model). The teacher model includes a larger set of data than the student model and is, thus, more complex than the student model but is also more computationally cumbersome. Thus, when processing the same input data, the teacher model will generally be slower than the student model to generate outcomes, such as rewards. Thus, the student model has lower resource requirements compared to the teacher model and has a lower latency in providing results. In real-time engagement with a user, such as identifying job opportunities for an online job seeker, where speed matters, processing with the student model provides a technical speed advantage. Knowledge distillation can enable the student model to closely approximate the accuracy of a teacher model while maintaining the processing speed advantage of the student model. Thus, by distilling knowledge of the teach model to train the student model, performance degradation can be minimized, while achieving lower latency. Therefore, with its lower latency in providing results, the student model can be used for real time decision making, which is particularly useful to a user operating in a real-time, online environment.

In at least one embodiment, the knowledge distillation systems and methods utilize a replay buffer that allows the teacher model to augment student model data tuples. Data tuples are generally used to store associated data. User input data represents one data vector in the tuple. User input data can be, for example, user preferences and/or inferred data related to the user. In a multi-armed bandit (MAB) type neural network process, an arm represents a particular action. MAB derives its name from a visualization of a row of gambling slot machines, and a gambler chooses which arm(s) on the slot machines to pull, how many times to pull, and which order to pull to maximize the gambler's reward. A neural network can explore and exploit any number of actions to process the input data and in an attempt to maximize a reward. For example, in a job search context, based on user input data and a large set of available job opportunities, an MAB type neural network can attempt to identify the best presentation of a job opportunity creative, e.g. a web page, that will provide the best reward. The reward value is a matter of design choice. For example, in at least one embodiment, evaluation of the reward associated with presentation of a creative, such as the web page, relates to the appeal of the creative, such whether the user interacts with the creative. In at least one embodiment, in a job search context, a reward can also be more complex, such as whether the user/job seeker interacts with the creative and/or whether the user/job seeker applies for the job represented by the creative. In another embodiment, based on user input data and a large set of available job opportunities, an MAB type neural network can attempt to determine the job that will most likely result in a job offer to the user. The knowledge distillation systems and methods utilizing the replay buffer and augmented data, in at least one embodiment, allow the teacher model to distill knowledge to the student model to allow the student model to solve neural network problems, such as MAB type neural network problems, with, as previously mentioned, improved speed relative to the teacher model while approximating the accuracy of the teacher model.

The disclosure below begins with a description of a technical environment of the knowledge distillation systems and methods. The disclosure continues with more detailed information regarding the knowledge distillation systems and methods utilizing the replay buffer that allows the teacher model to augment student model data tuples and improve the accuracy of the student model relative to conventional knowledge distillation processes.

FIG. 1 depicts an exemplary network environment 100 in which at least some embodiments of the methods and systems described below may be practiced. Network 102 (e.g., a private wide area network (WAN) or the Internet) includes a number of networked server computer systems 104(1)-(N). In certain implementations, the server computer systems 104(1)-(N) are part of one or more enterprise or business entity systems. The server computer systems 104 (1)-(N) (also referred to as "server(s) 104(1)-(N)") may be accessible by user computer systems 106(1)-(N) (also referred to as "client(s) 106(1)-(N)") client(s) 106, where N is the number of server computer systems connected to the network, and the value N may be different for the server and user computer systems. Communication between user(s) computer systems 106(1)-(N) and server(s) 104(1)-(N) typically occurs over a network, such as a public switched telephone network over asynchronous digital subscriber line (ADSL) telephone lines or high-bandwidth trunks, for example communications channels providing T1 or OC3 service. Client(s) 106(1)-(N) typically access client(s) 104 (1)-(N) through a service provider, such as an internet service provider ("ISP") by executing application specific software, commonly referred to as a browser, on one of client(s) 106(1)-(N).

Server(s) 104(1)-(N) and/or client(s) 106(1)-(N) are programmed to become specialized machines to implement at least some embodiments of the below described systems and methods. The specialized computer systems may, for example, include a mainframe, a mini-computer, a personal computer system including notebook computers, wireless, mobile computing devices (including personal digital assistants, smart phones, and tablet computers), etc. When programmed to implement at least some of the embodiments of the below described systems and methods, the computer systems are specialized machines. These computer systems are typically information handling systems, which are designed to provide computing power to one or more users, either locally or remotely. Such a computer system may also include one or a plurality of input/output ("I/O") devices coupled to the system processor to perform specialized functions. Tangible, non-transitory memories (also referred to as "storage devices") such as hard disks, compact disk ("CD") drives, digital versatile disk ("DVD") drives, and magneto-optical drives may also be provided, either as an integrated or peripheral device. At least some of the embodiments of the below described systems and methods can be implemented using code stored in a tangible, non-transient computer readable medium and executed by one or more processors. At least some of the embodiments of the below described systems and method can be implemented completely in hardware using, for example, logic circuits and other circuits including field programmable gate arrays.

In various implementations, one or more of client(s) 104(1)-(N) provide creative(s) 108(1)-(N), where N is an index value representing any number of total creatives. Creatives 108(1)-(N) may be interactive webpages with clickable content. The creatives 108(1)-(N) are depicted as webpages for a Supervisory Aerospace Engineer. However, the creatives can be any output, such as any webpage or any other content type of any format including, audio, images, videos, or other visuals, text, or any combination thereof. Several creatives 108(1)-(N) or interactive webpages can be presented to users; however, certain creatives 108(1)-(N) are more applicable to particular users.

Through the use of contextual bandit algorithms executed in multiple neural networks by one of more of the servers 104(1)-(N), the one or more servers 104(1)-(N) determine and present a specific creative 108 to a user through the user's client system 106. Individuals/users associated with or using a client 106 provide specific user features 110. For example, in a job searching scenario, features 110 can include career, experience, occupation, interest, education, salary, and other established data or selected preferences. Other user features 110 can be inferred or derived based on the established data and preferences. Such inferred user features can include, for example, an individual's background, job title, occupation, job search history, etc. The user features 110 provide context for a server 104 to provide a preferred output. The user features 110 can be mapped to specific values that can be represented as vectors. For example, multiple careers can be mapped to specific values, and a user selected career can be mapped to the value assigned to that career. The server 104 processes the user features 110 utilizing one or more contextual bandit algorithms, as described in more detail below, to determine an output that represents the best, determined output for the user. The server 104 then presents the best creative 108 to the specific individual/user based on the context of the specific individual/user.

Figure 2:
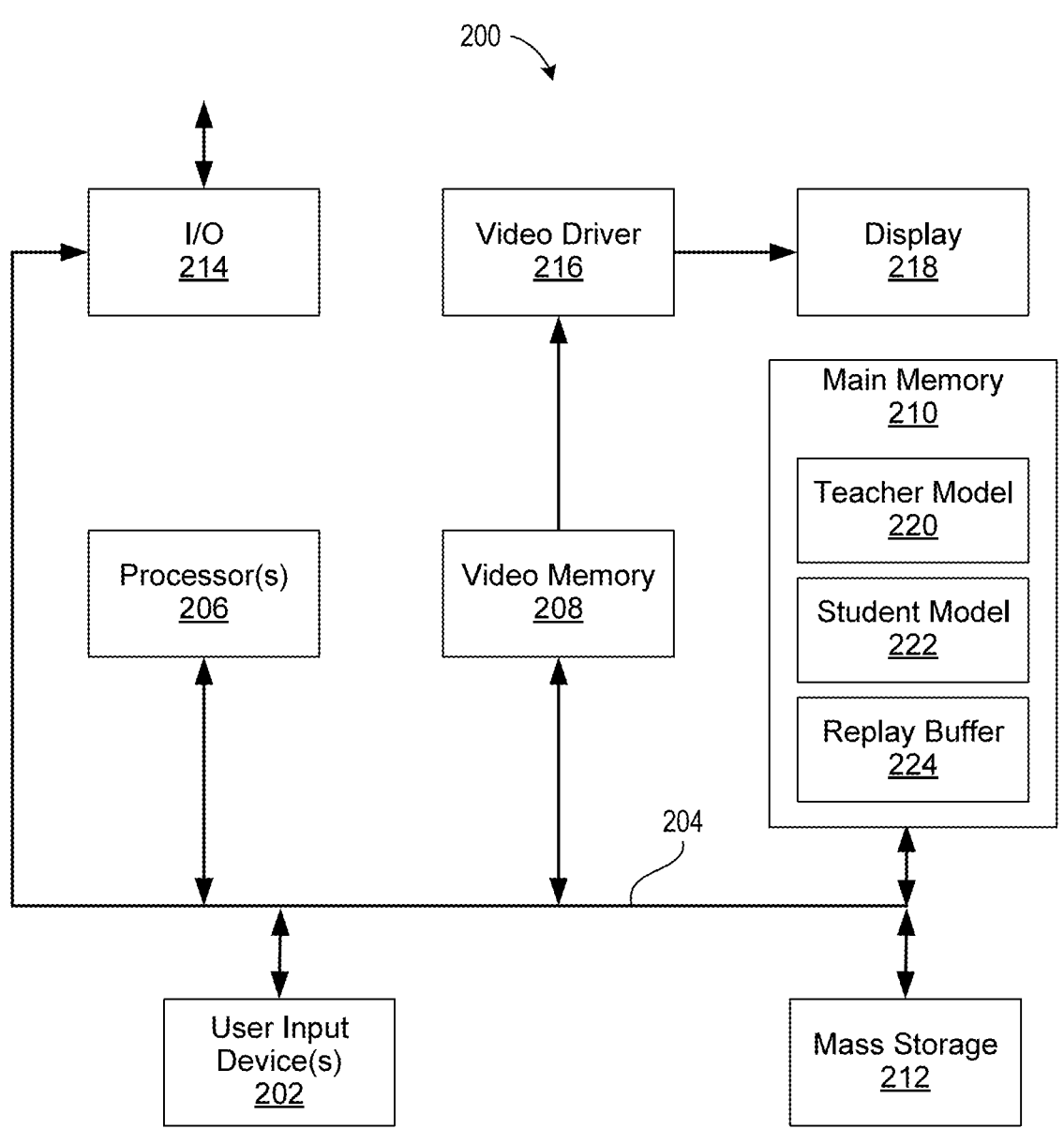
FIG. 2 depicts an example specialized computer system.

FIG. 2 depicts an example specialized computer system that can represent at a hardware level servers 104(1)-(N) and clients 106(1)-(N). At least some of the embodiments of the below described systems and methods can be implemented on a specially programmed computer system such as computer 200 illustrated in FIG. 2. The computer 200 can be a dedicated computer system or a virtual, emulated system located in, for example, a cloud computing environment. User input device(s) 202, such as a keyboard and/or mouse, are coupled to a bi-directional system bus 204. The user input device(s) 202 are for introducing user input to the computer system and communicating that user input to processor(s) 206. The computer system of FIG. 2 generally also includes a non-transitory video memory 208, non-transitory main memory 210, and non-transitory mass storage 212 all coupled to bi-directional system bus 204 along with user input device(s) 206 and processor(s) 206. The mass storage 212 may include both fixed and removable media, such as a hard drive, one or more CDs or DVDs, solid state memory including flash memory, and other available mass storage technology. Bus 204 may contain, for example, 32 of 64 address lines for addressing video memory 208 or main memory 210. The system bus 204 also includes, for example, an n-bit data bus for transferring DATA between and among the components, such as processor(s) 206, main memory 210, video memory 208 and mass storage 212, where "n" is, for example, 32 or 64. Alternatively, multiplex data/address lines may be used instead of separate data and address lines.

I/O device(s) 214 may provide connections to peripheral devices, such as a printer, and may also provide a direct connection to remote server computer systems via a telephone link or to the Internet via an ISP. I/O device(s) 214 may also include a network interface device to provide a direct connection to remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O device(s) 214 include modems, sound and video devices, and specialized communication devices such as the aforementioned network interface.

Computer programs and data are generally stored as instructions and data in a non-transient computer readable medium such as a flash memory, optical memory, magnetic memory, compact disks, digital versatile disks, and any other type of memory. The computer program is loaded from a memory, such as mass storage 212, into main memory 210 for execution. Computer programs may also be in the form of electronic signals modulated in accordance with the computer program and data communication technology when transferred via a network.

Processor(s) 206 are any other suitable single or multiple microprocessors or microcomputers may be utilized. Main memory 210 includes dynamic random access memory (DRAM). Video memory 214 may be a dual-ported video random access memory. One port of the video memory 208 is coupled to video driver 216. The video driver 216 is used to drive the display 218. Video driver 216 is well known in the art and may be implemented by any suitable means. This circuitry converts pixel DATA stored in video memory 208 to a raster signal suitable for use by display 21. Display 218 is a type of monitor suitable for displaying graphic images.

The computer system described above is for purposes of example only. It is contemplated that at least some of the embodiments of the below described systems and methods might be run on a stand-alone computer system, such as the one described above. At least some of the embodiments of the below described systems and method might also be run from a server computer systems system that can be accessed by a plurality of client computer systems interconnected over an intranet network. Finally, at least some of the embodiments of the below described systems and method may be run from a server computer system that is accessible to clients over the Internet.

In various embodiments, the main memory 210 includes a fully complex neural network model, teacher model 220. The teacher model 220 is configured to perform various contextual bandit algorithms, as well known in the field. Examples of such contextual bandit algorithms include LinUCB and LinTS. Furthermore, teacher model 220 can implement deep learning and approximate Bayesian algorithms and methods which, when distilled to the student model 222 utilizing the replay buffer 224, can result in greater performance over a variety of data sets. The teacher model 220 is considered a full complex model relative to the less cumbersome, e.g. a sparser data set, student model 222, implementing deep contextual bandit algorithms. Although the teacher model 220 provides very good performance, the teacher model 220 requires relatively greater processing and memory resources, which can result in undesirable latency in providing results.

Figure 3:
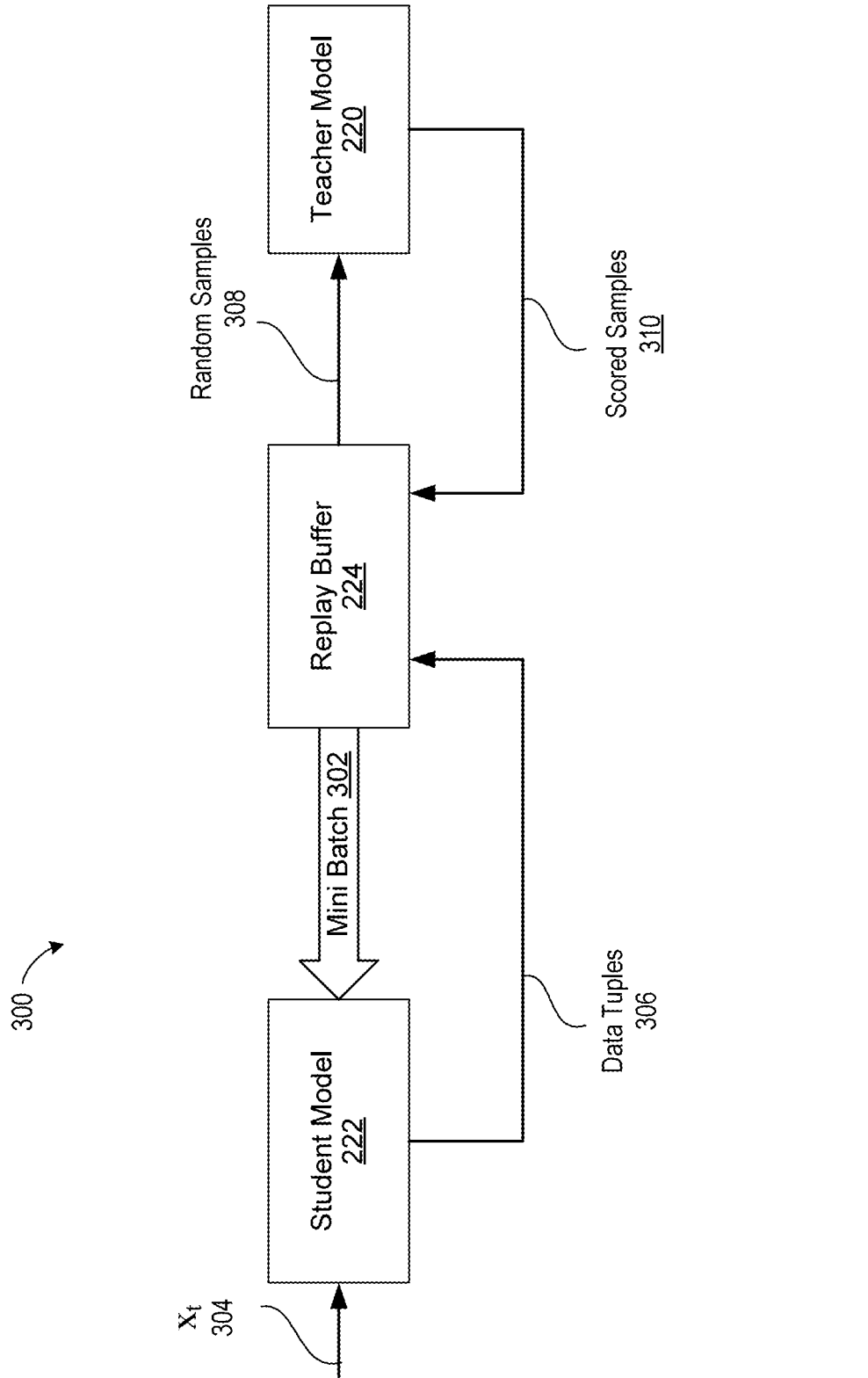
FIG. 3 depicts an embodiment of a knowledge distillation system and method to train neural networks utilizing a non-conventional replay buffer and augmented data tuples.

FIG. 3 depicts a knowledge distillation system and method 300 to train neural networks utilizing a non-conventional replay buffer and augmented data tuples. The knowledge distillation system and method 300 depicts one embodiment of the components and interaction of the teacher model 220, student model 222 and replay buffer 224 of FIG. 2-. Embodiments of operations performed by the knowledge distillation system and method 300 are further described with reference to FIGS. 5 and 6.

Referring to FIGS. 2 and 3, in an example contextual bandit setup, the teacher model 220 makes sequential decisions at time steps $\{1, 2, \ldots, T\}$ which are based on observations of an environment that includes an output type, such as a particular arm/action output and an input, such as a context vector $x_t$. At each time step t, teacher model 220 observes a context vector $x_t$ and is given a set of arms/actions $A_t$ to choose from. For example, in the job searching scenario discussed above, the features 110 of a specific user can be concatenated to provide a context vector $x_t$. In this scenario, the arms/actions $A_t$ to choose from are creatives 108 such as the various presentations of a job opportunity as, for example, depicted in FIG. 7.

Based on observed payoffs in previous time steps, the teacher model 220 chooses an arm/action $a_t \in A_t$, and receives a payoff or reward value of $r_t$, $a_t$ whose expectation depends on $x_t$ and $a_t$. The teacher model 220 can improve arm/action selection strategy with newly collected observation $(x_t, a_t, r_t, a_t)$. An objective is to minimize "regret", which is defined by equation (1) below:

$$R_{\Omega}(T) = E\left[\sum_{t=1}^{T} r_{t,a_t^*}\right] - \left[\sum_{t=1}^{T} r_{t,a_t}\right] \tag{1}$$

The value $\Omega$ is the arm-choosing policy of the teacher model 220. The value $a_t^*$ is the arm with maximum expected payoff or reward at time t. In certain implementations, a binary (1, 0) payoff or reward is used; however, the performance of the contextual bandit algorithm can also be evaluated using cumulative rewards. For arms that are not chosen at time step t, no reward is observed for that time step t.

Implementations can provide for multiple teacher models 220, a teacher model 220 for each arm/action $A_i$, or a single teacher model 220 with parameterized arms. The teacher model(s) 220 are pretrained and may be pretrained offline. Although, the teacher model 220 has high accuracy, the teacher model is relatively complex with high latency in performing decision making Therefore, for online use, the teacher model 220 may not be feasible for use. In various implementations, a light weight student model 222 is used for online decision making. The student model 222 learns from the behaviors of both the teacher model 220 as well as ground truth, which are partially observed rewards associated with chosen actions.

To allow the teacher model 220 to provide guidance for student model 222 during online updates a replay buffer 224 is implemented. In certain implementations, the replay buffer 224 is part of the main memory 210. The replay buffer 224 is similar to that used in neural network based reinforcement learning. In at least one embodiment, replay buffer 224 does not remove temporal correlations in a training sample and accommodates for the latency or other speed gap between the teacher model 220 and student model 222.

With the use of replay buffer 224, online updates of the student model 22 can be performed in mini batches 302. Upon receiving a context vector $x_i$ or $x_t$ 304, the student model makes a decision $a_i$ using a sampling algorithm with dropout. An example of such a sampling algorithm is the Thompson sampling algorithm shown in FIG. 4. It is to be understood that other sampling algorithms can be implemented.

The student model 222 then receives a reward r and stores a tuple $(x_i, a_i, r_i)$ or data tuples 306 into the replay buffer 224. In at least one embodiment, the replay buffer 224 stores actual data tuples $(x_i, a_i, r_i)$ and augmented data tuples 306 $(x_i, a_u, \hat{r}_1)$. The teacher model 220 randomly samples data points or random samples 308 from the replay buffer 224. By randomly sampling data points, computational resources can be minimized. The replay buffer 224 can implement a first in, first out (FIFO) replacement policy. The size of the replay buffer 224 can be dependent on how many stale data points to keep. In at least one embodiment, a stale data point is a data point collected prior to a predetermined date/time, whose value is a matter of design choice. Because the teacher model 220 is slower than the student model 222, the teacher model 220 generally cannot determine an action correlated to a best reward for all the data points in real time. Therefore, the teacher model 220 augment random samples of unscored data points in the replay buffer 224 for subsequent sampling by the student model 222. A down-sample rate $\in$ can be decided based on processing capacity of the teacher model 220.

The teacher model 220 augments each tuple $(x_i, a_i, r_i)$ with $(x_i, a_u, \hat{r}_1)$, where $a_u \in A$, where A is a set of all arm actions, and $a_t$ is an unselected, counterfactual action. $\hat{r}_1$ represents a softened reward, which is value selected from a probability distribution of rewards correlated to the context vector and arm used to generate $r_t$ by the teacher model 220. The value representation of $\hat{r}_1$ is a matter of design choice, such as a binary value of 0 or 1 or a continuous value chosen from any real number or within a boundary set of, for example, 0 to 1, for increased granularity. Therefore, the augmented data can be a considered as a prediction by the teacher model 220. The augmented data is represented as scored samples 310 that are sent to the replay buffer 224.

At the end of each time interval, the student model 222 can randomly draw mini-batches 302 from the replay buffer 222 and updates the parameters in student model 222 by minimizing a cost function implementing a "loss function." An example loss function is described below with reference to Equation (2).

In contextual bandit problems, generally rewards of chosen arms/actions can be observed. For a given arm/action a, when the ground truth reward is available, the loss function computed from ground truth for a given sample i is defined by Equation 2 below:

$$L_{KD}^a(i) = (1 - \alpha)L\left(r^{a(i)}, \hat{y}_s^{a(i)}\right) \tag{2}$$

where L is the cross-entropy loss for student model 222, $r^{a(i)}$ is the ground truth reward arm/action a receives for sample i, $\hat{y}_s$ is the predicted reward computed by the student model 222 when a given arm/action a is chosen. Parameter $\alpha \in [0, 1]$ controls the relative contribution between ground truth label and teacher model 220 predictions.

When scores from teacher model 220 become available for the given sample, an additional loss function term is defined by Equation (3) below.

$$L_{KD}^a(i) = \alpha D_{KL}\left(\sigma\left(\frac{\hat{y}_t^{a(i)}}{T}\right), \lambda\left(\frac{\hat{y}_s^{a(i)}}{T}\right)\right)T^2 \tag{3}$$

where $\hat{y}_t$ is the output of teacher model 220 for the given arm, T is the temperature (a higher value of T decreases a likelihood of exploring alternatives and vice versa), $\sigma$ is a softmax function, and $\lambda$ is the log-softmax function. Both T and $\alpha$ are hyperparameters that can be tuned. The value of T is a matter of design choice and, in at least one embodiment, is 1.

As described above with regard to the example contextual bandit setup, when the teacher model 220 scores a data sample, the teacher model 220 computes an output for not only the arm/action that is chosen but also for those arms/actions that are not actually chosen, given the same input context vector. In at least one embodiment, these additional arms/actions represent augmented arms/actions and provide the additional information to improve the student model 222 learning the reward function of less-chosen arms/actions more efficiently and can speed up the distillation training.

When learning in batches, Equations (2) and (3) are aggregated, and the loss function for an arm a for a given batch is defined by Equation (4) below:

$$L_{KD}^a = \tag{4}$$

-continued $$(1 - \alpha)\sum_{i=1}^{N}I_g(a, i)L\left(r^{a(i)}, \hat{y}_s^{a(i)}\right) + \alpha\sum_{i=1}^{N}I_t(i)D_{KL}\left(\sigma\left(\frac{\hat{y}_t^{a(i)}}{T}\right), \lambda\left(\frac{\hat{y}_s^{a(i)}}{T}\right)\right)T^2$$

N is batch size. $I_g(a, i)$ is an indicator function for whether arm a is selected for sample i. $I_t(i)$ is an indicator function for whether sample i is scored by teacher model 220.

If $N_a$ is the number of times arm a is selected by the policy, and $N_t$ is the number of times the output from the teacher model 220 is available in a given batch, then the above loss function is equivalent to Equation (5) below:

$$L_{KD}^a = (1 - \alpha)\frac{N_a}{N}L\left(r^{a(i)}, \hat{y}_s^{a(i)}\right) + \alpha\frac{N_t}{N}D_{KL}\left(\sigma\left(\frac{\hat{y}_t^{a(i)}}{T}\right), \lambda\left(\frac{\hat{y}_s^{a(i)}}{T}\right)\right)T^2 \quad (5)$$

The contribution of loss from ground truth label for arm/action a is driven by a and also the number of times the arm/action is chosen, as well as the number of times scores from teacher model 220 are available. Since the number of times the arm/action is chosen varies for different arms and actions, the relative contribution of ground truth and teacher models 220 in the loss functions for different arms and action will vary which can cause bias. To alleviate bias, the contribution to loss function can be modified from ground truth for the distilled bandit algorithm as defined by Equation (6) below:

$$L_{KD}^a = (1 - \alpha)\frac{1}{p_a^t}L(r^a, \hat{y}_s^a) \quad (6)$$

$$p_a^t = \frac{N_a}{N}$$

is the probability of arm a being chosen up to time t. Pseudo counts can be applied to the calculation of $$p_a^t$$

in order to avoid numerical issues in cold start situations. Low thresholds can be applied to $$p_a^t,$$

such that for rarely chosen arms/actions, the probabilities do not become too small, otherwise the probabilities can dominate the loss function. The $$p_a^t$$

can be calculated by Equation (7) below:

$$p_a^t = \frac{N_a + \beta_0}{N + \beta_1} \quad (7)$$

Figure 5:
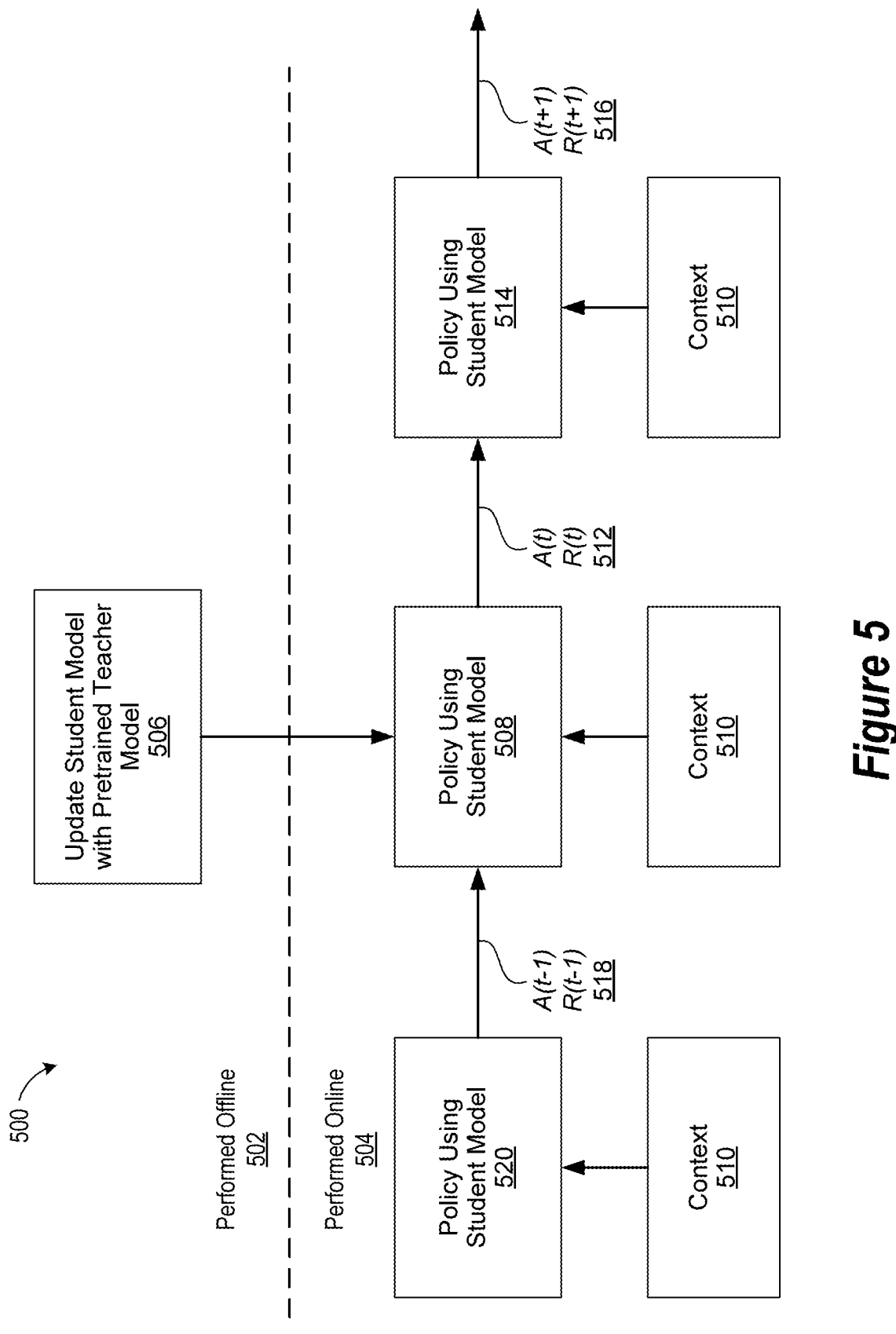
FIG. 5 is an example process of solving contextual bandit problems.

FIG. 5 is an example process of solving contextual MAB problems. The process 500 implements an embodiment of the pretrained teacher model 220 and the student model 222. As discussed, in offline operation 502, training of the teacher model 220 is generally performed offline, i.e. not used to provide real-time responses to a user. The student model 222 decision making and learning/training generally occurs in online operation 504, i.e. in real-time to provide real-time responses to a user. The teacher model 220 provides updates to the student model as represented by element 506, and as discussed above. In at least one embodiment, training of the student model 222 and the teacher model 220 and knowledge distillation from the teacher model 220 to the student model 222 can occur with both models offline, particularly during initial or any enhanced formation and training to the respective models.

In at least one embodiment, knowledge distillation system and method 300 perform element 506 at a time t and updates an arm-choosing policy using student model 508. The policy is associated with a context 510. At time t, the policy implemented by the student model 508 is associated with an arm/action A(t) and reward R(t) 512. The data of A(t), R(t) 512 which is generated online 504, is used to train the student model and update policy using student model 514. Policy using student model 514 outputs A(t+1), R(t+1) 516 which can be used for further update to the policy performed online 504 by the student model 222. Likewise, policy using student model 508 is updated with an outputs A(t−1), R(t−1) 518 by policy using student model 5.

FIG. 6 depicts an example knowledge distillation process 600 performed by embodiments of the knowledge distillation system and method 300. The knowledge distillation process 600 begins at start operation 602.

At operation 604, the teacher model 220 is pretrained. The teacher model 220 represents a full complex model relative to the student model 222 and implements deep contextual multi-arm bandit (MAB) algorithms such as the LinUCB and LinTS algorithms. The pretraining of the teacher model 220 can be performed offline.

At operation 606, input context vector x is received by the teacher model 220 and the student model 222. In particular, the context vector x is associated with a user, such as a job seeker. The student model 222 is a lightweight model with sparser data relative to the teacher model 220 and implements contextual multi-arm bandit derived data as determined by the teacher model to perform online decision making or the calculation of data tuples. The data tuples as represented by (xi, ai, ri) where xi defines a context vector, ai is the arm/action, and ri is the reward or payoff. In certain implementations, the least of the data tuples are stored in the replay buffer 224.

At operation 608, the input context vector $x_t$ are provided to the teacher model 220 and the student model 222. At operation 610, a determination is performed by the student model 222 as to an input context vector $x_t$, as shown in element 304 of FIG. 3. The student model 222 using a contextual MAB algorithm to determine MAB data tuples, where the MAB data tuples include the context vector $x_t$, an arm $a_t$, and a reward $r_t$. At operation 612, the contextual MAB data tuples as determined by the student model 222 is stored in a replay buffer 224.

At operation 614, the teacher model 220 samples contextual MAB data tuples stored by the student model 222 in the replay buffer 224. In at least one embodiment, randomly sampling of data tuples can help to conserve resources used by the teacher model 220. At operation 616, the teacher model 220 determines augmented contextual data MAB data tuples for the context vector $x_t$ using the contextual MAB algorithm. As discussed, the teacher model 220 augments each tuple (xi, ai, ri) with (xi, au), where au$\in$A\ai is an unselected, counterfactual action. The value $\hat{r}_i$ is the softened or theoretical reward generated by the teacher model. In certain implementations, $\hat{r}_i$ can be a non-binary value, for example a percentage value. Therefore, the augmented data can be a considered as a prediction by the teacher model 220. The augmented data is represented as scored samples 310 that are sent to the replay buffer 224.

At operation 618, the teacher model 220 processes the contextual MAB data tuples sampled from the replay buffer 224 to correlate the sampled contextual MAB data tuples with the augmented contextual data MAB data tuples.

At operation 620, the augmented contextual MAB data tuples are stored in the replay buffer 224. The augmented data tuples can be represented as scored samples. Because teacher model 220 may not be able to score all data points in real time, teacher model 220 augments random samples of unscored data points in the replay buffer 224. At operation 622, the student model 222 is updated with a proper subset of the augmented contextual data of contextual MAB data tuples. At operation 624, the process 600 ends.

Figure 7:
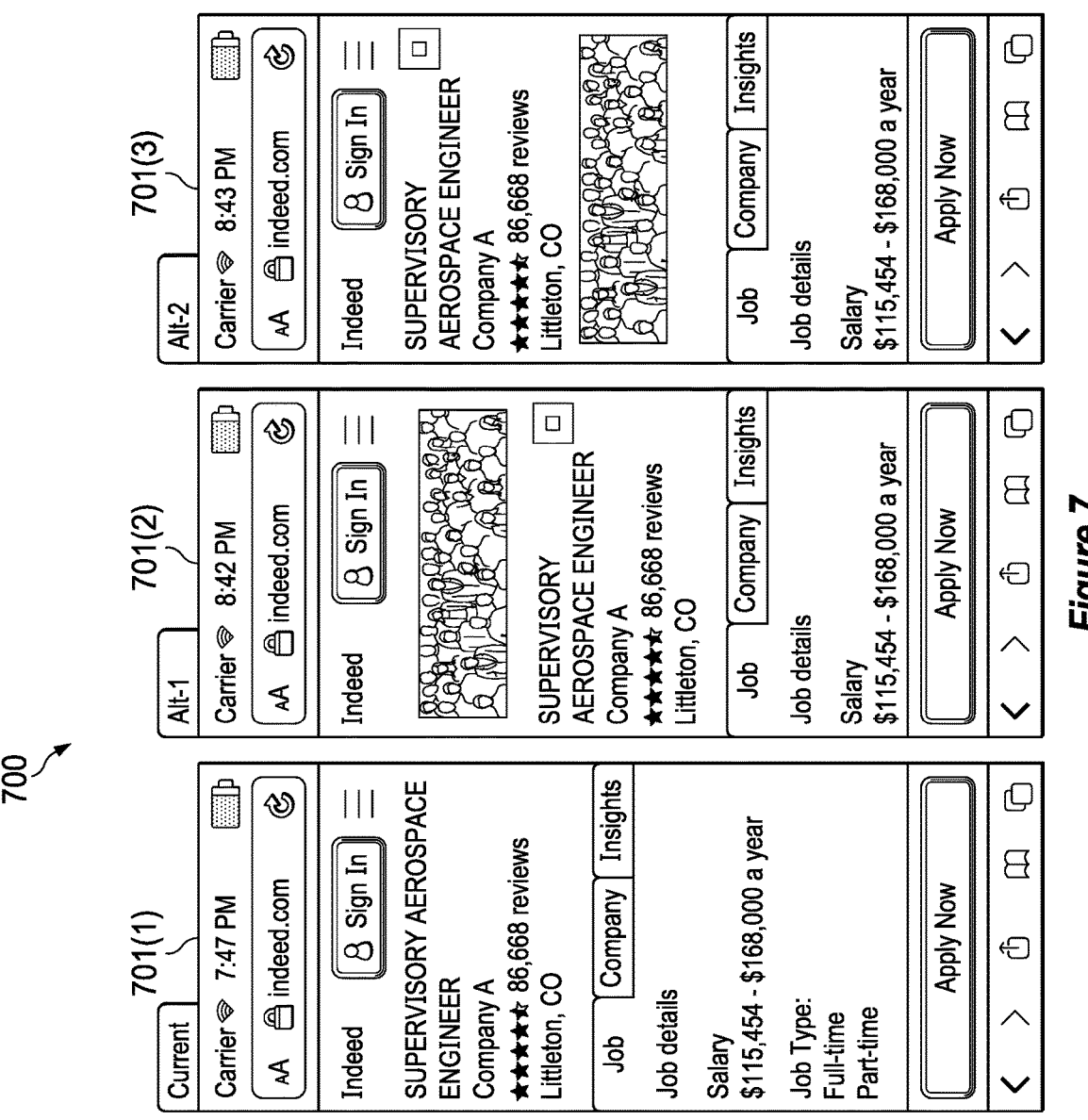
FIG. 7 depicts exemplary creatives.

FIG. 7 depicts creatives 701(1), 701(2), and 701(3), which represent examples of creatives 108(1)-(N) for N equal to 3. Creatives 701(1), 701(2), and 701(3) depict three different presentations for provision to and display by a client of a Supervisory Aerospace Engineer.

Embodiments of the network environment of FIG. 1, the specialized computer system of FIG. 2, and the knowledge distillation system and method of FIG. 3, and processes associated therewith are described with reference to flow-chart illustrations and/or block diagrams of methods, appa-ratus (systems) and computer program products. It will be understood that each block of the flowchart illustrations and/or block diagrams, and combinations of blocks in the flowchart illustrations and/or block diagrams, can be imple-mented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block dia-gram block or blocks.

These computer program instructions may also be stored in a computer-readable memory that can direct a computer or other programmable data processing apparatus to function in a particular manner, such that the instructions stored in the computer-readable memory produce an article of manufac-ture including instruction means which implement the func-tion/act specified in the flowchart and/or block diagram block or blocks.

The computer program instructions may also be loaded onto a computer or other programmable data processing apparatus to cause a series of operational steps to be per-formed on the computer or other programmable apparatus to produce a computer-implemented process such that the instructions which execute on the computer or other pro-grammable apparatus provide steps for implementing the functions/acts specified in the flowchart and/or block dia-gram block or blocks.

Thus, knowledge distillation systems and methods train neural networks utilizing a non-conventional replay buffer and augmented data tuples. The disclosed system is well adapted to attain the advantages mentioned as well as others inherent therein. While the disclosed system has been depicted, described, and is defined by reference to particular embodiments, such references do not imply a limitation on the scope of the disclosure, and no such limitation is to be inferred. The disclosed system is capable of considerable modification, alteration, and equivalents in form and func-tion, as will occur to those ordinarily skilled in the pertinent arts. The depicted and described embodiments are examples only and are not exhaustive of the scope of the teachings of the present application.

What is claimed is:

1. A computer-implemented method for training a student model neural network of a knowledge distillation system using a teacher model neural network of the knowledge distillation system, the method comprising:

pretraining, using a contextual multi-arm bandit (MAB) algorithm, the teacher model neural network to, for offline use, determine sets of contextual MAB data tuples based on sets of input context vectors;

training, using the pretrained teacher model neural net-work, the student model neural network to, for online use, determine sets of contextual MAB data tuples based on sets of input context vectors;

determining, by the trained student model neural network using the contextual MAB algorithm, contextual MAB data tuples for a context vector;

storing the contextual MAB data tuples in a replay buffer that is a same memory of the knowledge distillation system as the teacher model neural network and the student model neural network, wherein the replay buf-fer enables online updates of the trained student model neural network using batches of data in the replay buffer;

sampling, by the pretrained teacher model neural network, the contextual MAB data tuples from the replay buffer;

determining, by the pretrained teacher model neural net-work using the contextual MAB algorithm, augmented contextual data MAB data tuples for the context vector;

correlating, by the pretrained teacher model neural net-work, the sampled contextual MAB data tuples with the augmented contextual data MAB data tuples;

storing the correlated augmented contextual MAB data tuples in the replay buffer;

further training, by the trained student model neural network accessing the replay buffer, the trained student model neural network using a batch of the correlated augmented contextual MAB data within the replay buffer; and determining, by the further trained student model neural network processing user features obtained from a user device, a creative to present to the user, wherein:

each contextual MAB data tuple comprises a data set ($x_i$, $a_i$, $r_i$), wherein "i" represents any index value, each augmented contextual MAB data tuple comprises a data set ($x_i$, $a_u$, $\hat{r}_i$), wherein "u" represents any index value, and $x_i$ represents an $i^{th}$ context vector, $a_i$ represents a counter-factual $i^{th}$ bandit arm, $r_i$ represents an award correlated to the context vector $x_i$ and the bandit arm $a_i$, $a_u$ represents a $u^{th}$ bandit arm, and $\hat{r}_i$ represents a softened reward.

2. The computer-implemented method of claim 1 wherein determining the augmented contextual MAB data tuples comprises: determining a probability distribution of predic-tive rewards corresponding to a context vector and one or more arm values.

3. The computer-implemented method of claim 1, wherein further training the trained student model neural network comprises:

randomly sampling the contextual MAB data tuples and augmented contextual MAB data tuples stored in the replay buffer; and transferring the randomly sampled contextual MAB data tuples and augmented contextual MAB data tuples to the trained student model neural network to update the trained student model neural network.

4. The computer-implemented method of claim 1, further comprising: providing, to the user device, the creative as a reward that correlates to an arm value ai having a highest reward value ri.

5. The computer-implemented method of claim 1, further comprising: minimizing regret for a given reward ri to improve an arm ai selection strategy, wherein "i" is an index value.

6. The computer-implemented method of claim 1, further comprising:

performing a loss function when updating parameters of contextual data of the contextual MAB data tuples.

7. A system comprising:

one or more servers of a knowledge distillation system, wherein the one or more servers include:

one or more processors; and one or more non-transitory, computer-readable storage media storing code that, when executed by the one or more processors, cause the one or more processors to:

pretrain, using a contextual multi-arm bandit (MAB) algorithm, a teacher model neural network to determine sets of contextual MAB data tuples based on sets of input context vectors;

train, using the pretrained teacher model neural network, a student model neural network to determine sets of contextual MAB data tuples based on sets of input context vectors;

determine, by the trained student model neural network using the contextual MAB algorithm, contextual MAB data tuples for a context vector;

store the contextual MAB data tuples in a replay buffer that enables online updates of the trained student model neural network using batches of data in the replay buffer, wherein the replay buffer is in a same memory as the teacher model neural network and the student model neural network;

sample, by the pretrained teacher model neural network, the contextual MAB data tuples from the replay buffer;

determine, by the pretrained teacher model neural network using the contextual MAB algorithm, augmented contextual data MAB data tuples for the context vector;

correlate, by the pretrained teacher model neural network, the sampled contextual MAB data tuples with the augmented contextual data MAB data tuples;

store the correlated augmented contextual MAB data tuples in the replay buffer; and further train, by the trained student model neural network accessing the replay buffer, the trained student model neural network using a batch of the correlated augmented contextual MAB data within the replay buffer, wherein:

each contextual MAB data tuple comprises a data set $(x_i, a_i, r_i)$, wherein "i" represents any index value, each augmented contextual MAB data tuple comprises a data set $(x_i, a_u, \hat{r}_i)$, wherein "u" represents any index value, and $z_i$ represents an $i^{th}$ context vector, $a_i$ represents a counterfactual $i^{th}$ bandit arm, $r_i$ represents an award correlated to the context vector $x_i$ and the bandit arm $a_i$, $a_u$ represents a $u^{th}$ bandit arm, and $\hat{r}_i$ represents a softened reward.

8. The system of claim 7, wherein, to determine the augmented contextual MAB data tuples, the code, when executed by the one or more processors, cause the one or more processors to: determine a probability distribution of predictive rewards corresponding to a context vector and one or more arm values.

9. The system of claim 7, wherein, to further train the trained student model neural network, the code, when executed by the one or more processors, cause the one or more processors to:

randomly sample the contextual MAB data tuples and augmented contextual MAB data tuples stored in the replay buffer; and transfer the randomly sampled contextual MAB data tuples and augmented contextual MAB data tuples to the trained student model neural network to update the trained student model neural network.

10. The system of claim 7, wherein the code, when executed by the one or more processors, cause the one or more processors to: Reply dated: Aug. 25, 2025 provide a reward to a user computer system that correlates to an arm value a; having a highest reward value ri.

11. The system of claim 7, wherein the code, when executed by the one or more processors, cause the one or more processors to: minimize regret for a given reward ri to improve an arm ai selection strategy, wherein "i" is an index value.

12. The system of claim 7 wherein the code, when executed by the one or more processors, cause the one or more processors to:

perform a loss function when updating parameters of contextual data of the contextual MAB data tuples.

13. A non-transitory computer-readable storage medium storing computer program code, wherein the computer program code when executed by a processor performs operations comprising:

pretraining, using a contextual multi-arm bandit (MAB) algorithm, a teacher model neural network of a knowledge distillation system to determine sets contextual multi-arm bandit (MAB) data tuples based on sets of input context vectors;

training, using the pretrained teacher model neural network, a student model neural network of the knowledge distillation system to determine sets of contextual MAB data tuples based on sets of input context vectors;

determining, by the trained student model neural network using the contextual MAB algorithm, contextual MAB data tuples for a context vector;

storing the contextual MAB data tuples in a replay buffer of the knowledge distillation system, wherein the replay buffer is in a same memory as the teacher model neural network and the student model neural network and enables online updates of the trained student model neural network using batches of data in the replay buffer;

sampling, by the pretrained teacher model neural network, the contextual MAB data tuples from the replay buffer;

determining, by the pretrained teacher model neural network using the contextual MAB algorithm, augmented contextual data MAB data tuples for the context vector;

correlating, by the pretrained teacher model neural network, the sampled contextual MAB data tuples with the augmented contextual data MAB data tuples;

storing the correlated augmented contextual MAB data tuples in the replay buffer;

further training, by the trained student model neural network accessing the replay buffer, the trained student model neural network using a batch of the augmented contextual data of contextual MAB data tuples within the replay buffer; and determining, by the further trained student model neural network processing user features obtained from a user device, a creative to present to the user, wherein:

each contextual MAB data tuple comprises a data set $(x_i, a_i, r_i)$, wherein "i" represents any index value, each augmented contextual MAB data tuple comprises a data set $(x_i, a_u, \hat{r}_i)$, wherein "u" represents any index value, and $x_i$ represents an it context vector, $a_i$ represents a counterfactual $i^{th}$ bandit arm, $r_i$ represents an award correlated to the context vector $x_i$ and the bandit arm $a_i$, $a_u$ represents a $u^{th}$ bandit arm, and $\hat{r}_i$ represents a softened reward.

14. The non-transitory computer-readable storage medium of claim 13 wherein determining the augmented contextual MAB data tuples comprises: determining a probability distribution of predictive rewards corresponding to a context vector and one or more arm values.

15. The non-transitory computer-readable storage medium of claim 13, wherein further training the trained student model neural network comprises:

randomly sampling the contextual MAB data tuples and augmented contextual MAB data tuples stored in the replay buffer; and transferring the randomly sampled contextual MAB data tuples and augmented contextual MAB data tuples to the trained student model neural network to update the trained student model neural network.

16. The non-transitory, computer-readable storage medium of claim 13, wherein the code is further executable by the processor to perform operations comprising: providing, to the user device, the creative, wherein the creative correlates to an arm value a; having a highest reward value ri, wherein "i" is an index value.

17. The non-transitory, computer-readable storage medium of claim 13, wherein the code is further executable by the processor to perform operations comprising: minimizing regret for a given reward ri to improve an arm ai selection strategy.

18. The computer-implemented method of claim 1, wherein each of the contextual MAB data tuples is stored in the replay buffer as the data set $(x_i, a_i, r_i)$ and each of the correlated augmented contextual MAB data tuples is stored in the replay buffer as the data set $(x_i, a_u, \hat{r}_i)$.

19. The system of claim 7, wherein each of the contextual MAB data tuples is stored in the replay buffer as the data set $(x_i, a_i, r_i)$ and each of the correlated augmented contextual MAB data tuples is stored in the replay buffer as the data set $(x_i, a_u, \hat{r}_i)$.

20. The non-transitory computer-readable storage medium of claim 13, wherein each of the contextual MAB data tuples is stored in the replay buffer as the data set $(x_i, a_i, r_i)$ and each of the correlated augmented contextual MAB data tuples is stored in the replay buffer as the data set $(x_i, a_u, \hat{r}_i)$.

* * * * *